(12) United States Patent
Carpenter et al.

(10) Patent No.: US 11,300,133 B2
(45) Date of Patent: *Apr. 12, 2022

(54) SURGE WEAR PREDICTOR FOR A TURBOCHARGER

(71) Applicant: Deere & Company, Moline, IL (US)

(72) Inventors: Kelly R. Carpenter, Cedar Falls, IA (US); Shaune Anders, Moline, IL (US); Mark A. Friedrich, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,099

(22) Filed: Dec. 9, 2019

(65) Prior Publication Data

US 2020/0109715 A1 Apr. 9, 2020

Related U.S. Application Data

(63) Continuation of application No. 15/293,083, filed on Oct. 13, 2016, now Pat. No. 10,570,909.

(51) Int. Cl.

| | |
|---|---|
| *F04D 27/00* | (2006.01) |
| *F04D 29/056* | (2006.01) |
| *F04D 29/063* | (2006.01) |
| *F02B 39/16* | (2006.01) |
| *F02C 6/12* | (2006.01) |
| *F04D 25/02* | (2006.01) |
| *F04D 29/058* | (2006.01) |
| *F02B 37/12* | (2006.01) |

(52) U.S. Cl.
CPC ............ *F04D 27/001* (2013.01); *F02B 37/12* (2013.01); *F02B 39/16* (2013.01); *F02C 6/12* (2013.01); *F04D 25/024* (2013.01); *F04D 29/056* (2013.01); *F04D 29/058* (2013.01); *F04D 29/063* (2013.01); *F02B 2037/125* (2013.01)

(58) Field of Classification Search
CPC .... F04D 25/024; F04D 27/001; F04D 29/056; F04D 29/058; F04D 29/063; F02B 39/16
See application file for complete search history.

(56) References Cited

U.S. PATENT DOCUMENTS

| | | |
|---|---|---|
| 4,399,548 A | 8/1983 | Castleberry |
| 4,594,050 A | 6/1986 | Gaston |
| 5,746,062 A | 5/1998 | Beaverson et al. |
| 6,438,484 B1 | 8/2002 | Andrew et al. |
| 7,108,477 B2 * | 9/2006 | Grauer .................. F04D 27/001 415/1 |

(Continued)

*Primary Examiner* — Brian P Wolcott
(74) *Attorney, Agent, or Firm* — Michael Best & Friedrich LLP

(57) ABSTRACT

A turbocharged device including a turbocharger, a first sensor in operable communication with the turbocharger and configured to output a first signal representative of a first attribute of the turbocharger, and a controller in operable communication with the first sensor. Where the controller is configured to calculate a first preliminary surge score based at least in part on the first signal, and calculate a first weighted surge score based at least in part on the first preliminary surge score and a first weighting factor configured to express the relative significance of the first preliminary surge score.

18 Claims, 3 Drawing Sheets

(56) References Cited

U.S. PATENT DOCUMENTS

| | | |
|---|---|---|
| 9,422,860 B2 * | 8/2016 | Polkus ................ F02D 41/0007 |
| 9,528,913 B2 | 12/2016 | Heda et al. |
| 10,047,757 B2 | 8/2018 | Srivastava et al. |
| 10,309,297 B2 * | 6/2019 | Lock ..................... F02B 37/007 |
| 2015/0204207 A1 | 7/2015 | Bulat et al. |
| 2016/0103012 A1 | 4/2016 | Liu |

* cited by examiner

SURGE WEAR PREDICTOR FOR A TURBOCHARGER

CROSS-REFERENCE TO RELATED APPLICATIONS

This patent application is a continuation of and claims priority to U.S. patent Ser. No. 15/293,083 filed Oct. 13, 2016, which is hereby incorporated by reference.

BACKGROUND

The present disclosure relates to a turbocharger having a controller configured to calculate the amount of wear inflicted by an individual compressor surge event.

Turbo or compressor surge is an unavoidable part of heavy-duty engine operation in extreme operating conditions and environments. In most instances, actions can be taken to shift turbocharger operation away from conditions that cause compressor surge to occur but such tradeoffs typically result in unacceptable impacts to performance.

SUMMARY

In one aspect, the disclosure provides a turbocharged device subject to a surge event during operation, the turbocharged device including a turbocharger having a bearing assembly, a first sensor in operable communication with the turbocharger, a second sensor in operable communication with the turbocharger, a third sensor operable to detect the oil pressure provided to the bearing assembly, and a controller. Where the controller is configured to determine a first preliminary surge score based at least in part on a signal provided by the first sensor in response to the surge event, determine a second preliminary surge score based at least in part on a signal provided by the second sensor in response to the surge event, determine a first weighted surge score based at least in part on the first preliminary surge score and a first weighting factor, determine a second weighted surge score based at least in part on the second preliminary surge score and a second weighting factor, and determine a combined surge score by combining the first weighted surge score and the second weighted surge score.

In another aspect, the disclosure provides a turbocharged device subject to a surge event during operation, the turbocharged device including a turbocharger having a controller and a bearing assembly, a first sensor configured to detect the oil pressure provided to the bearing assembly, a second sensor in operable communication with the turbocharger, where the controller is configured to determine the magnitude of the surge event based at least in part on a signal provided by the second sensor in response to the surge event, and where the controller is configured to determine the wear inflicted on the turbocharger during the surge event based at least in part on the magnitude of the surge event and a signal provided by the first sensor in response to the surge event.

In another aspect, the disclosure provides a turbocharged device including a turbocharger, a first sensor in operable communication with the turbocharger and configured to output a first signal representative of a first attribute of the turbocharger, and a controller in operable communication with the first sensor. Where the controller is configured to calculate a first preliminary surge score based at least in part on the first signal, and calculate a first weighted surge score based at least in part on the first preliminary surge score and a first weighting factor configured to express the relative significance of the first preliminary surge score.

In another aspect, the disclosure provides a turbocharged device including a turbocharger, a sensor in operable communication with the turbocharger and configured to output a signal representative of an attribute thereof, and a controller configured to calculate a wear score based at least in part on the output signal of the sensor, and wherein the controller is also configured to compare the wear score to a service life wear score of the turbocharger.

In another aspect, the disclosure provides a method of determining the magnitude of a potential surge event in a turbocharger having a first sensor and a second sensor in operable communication therewith, the method including calculating a first preliminary surge score based at least in part on a first signal output by the first sensor, calculating a first weighted surge score based at least in part on the first preliminary surge score and a first weighting factor configured to express the relative significance of the first preliminary surge score, calculating a second preliminary surge score based at least in part on a second signal output by the second sensor, calculating a second weighted surge score based at least in part on the second preliminary surge score and a second weighting factor configured to express the relative significance of the second preliminary surge score, combining the first weighted surge score and the second weighted surge score to produce a combined surge score, and comparing the combined surge score to a predetermined cut-off value.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure generally relates to a controller for use on a turbocharged device such as an internal combustion engine, and more particularly to a controller configured to monitor and record the operating conditions experienced by the turbocharger and utilize the collected data to determine when a surge has occurred, calculate the magnitude of the surge, and calculate how much wear the surge imparted on the turbocharger itself. Furthermore, the controller may utilize the collected data to determine the accumulated wear to the turbocharger over a period of time, and/or how much additional wear the turbocharger can receive before service or replacement is necessary.

Figure 1:
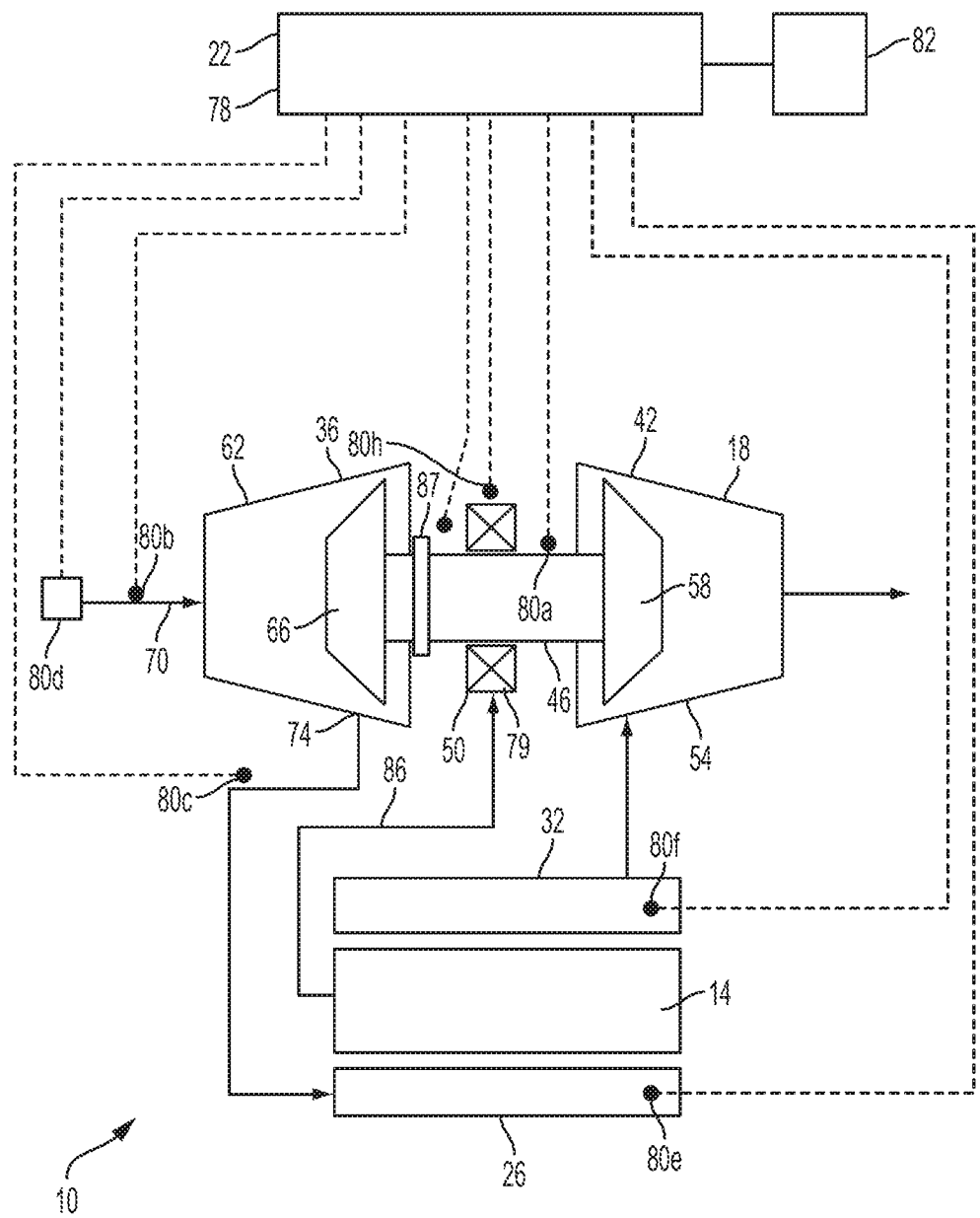
FIG. 1 is a schematic view of a device having an engine, a turbocharger, and a controller.

Referring to FIG. 1, a turbocharged device 10 includes an engine 14, a turbocharger 18 in operable communication with the engine 14, and a controller 22. The engine 14 of the device 10 is generally an internal combustion engine having an intake manifold 26 and an exhaust manifold 32. During use, the engine 14 receives air via the intake manifold 26, uses the intake air to generate power through combustion, and then expels heated exhaust gases via the exhaust manifold 32.

Illustrated in FIG. 1, the turbocharger 18 includes a compressor assembly 36, a turbine assembly 42, a shaft 46 operably connected to the turbine assembly 42 and the compressor assembly 36, a radial bearing assembly 50 rotatably supporting the shaft 46, and a thrust bearing assembly 87 coupled to the shaft 46.

The turbine assembly 42 includes a turbine housing 54 and a turbine wheel 58 positioned within and rotatable with respect to the turbine housing 54. The turbine wheel 58 in turn is coupled to and supported by the shaft 46 such that the two elements rotate together as a unit. The compressor assembly 36 of the turbocharger 18 includes a compressor housing 62 and a compressor wheel 66 positioned within and rotatable with respect to the compressor housing 62. The compressor wheel 66 in turn is coupled to and supported by the shaft 46 such that the compressor wheel 66, the shaft 46, and the turbine wheel 58 rotate together as a unit.

During use, the turbine assembly 42 receives heated exhaust gases from the exhaust manifold 32 of the engine 14 which pass over blades of the turbine wheel 58 creating torque and causing the turbine wheel 58, the shaft 46, and the compressor wheel 66 to rotate. As it rotates, the compressor wheel 66 draws ambient air into the compressor housing 62 through an inlet 70, compresses the air, and discharges the resulting compressed air through an outlet 74 where it is ultimately directed into the intake manifold 26 of the engine 14.

The radial bearing assembly 50 of the turbocharger 18 includes a ball or roller bearing 79 configured to rotatably support the shaft 46. During operation, the bearing assembly 50 receives oil from a pressurized oil source, typically the engine 14, to lubricate the bearing 50 and reduce wear during operation of the turbocharger 18.

The thrust bearing assembly 87 of the turbocharger 18 includes a ball or roller bearing 87 configured to limit axial movement of the shaft 46 with respect to the body of the turbocharger 18. During operation, the thrust bearing assembly 87 receives oil from a pressurized oil source, typically the engine 14, to lubricate the bearing 87 and reduce wear during operation of the turbocharger 18. More specifically, gas acting on the compressor wheel 66 and the turbine wheel 58 exert axial forces on the turbocharger shaft 46 which the thrust bearing 87 absorbs to limit axial motion.

While the illustrated turbocharger 18 is driven by the exhaust gasses of the engine 14 contacting the turbine wheel 58, in alternative implementations, the turbine assembly 42 may be replaced by an alternative drive source for the compression wheel 66 such as an electric motor (not shown) and the like.

Figure 2:
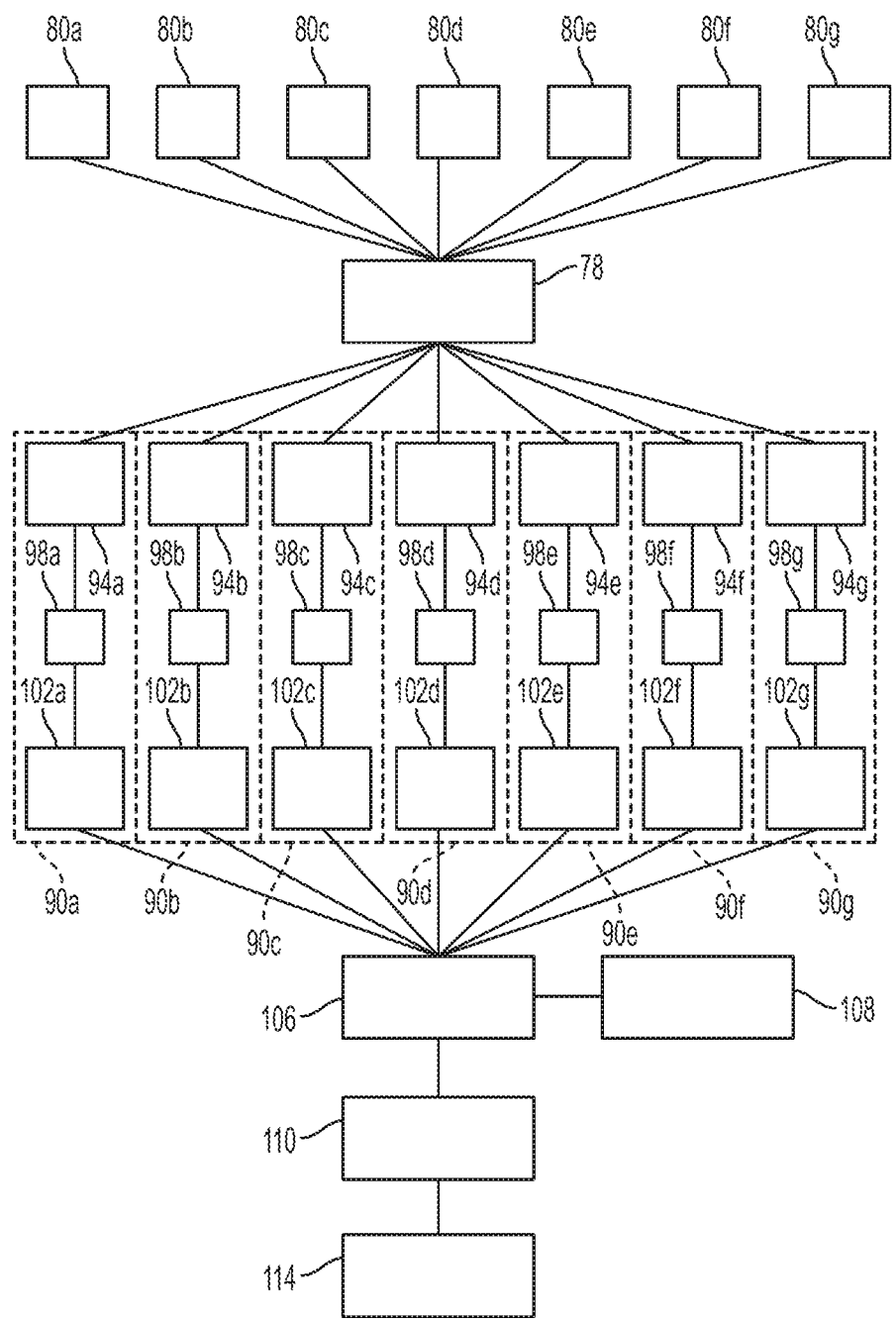
FIG. 2 is a flow-chart illustrating steps for calculating the wear inflicted on a turbocharger during a surge event.

Illustrated in FIGS. 1 and 2, the controller 22 includes a processor 78, a memory unit 82 in operable communication with the processor 78. The controller 22 is in communication with one or more sensors 80 and a user interface (not shown). The processor 78 may also be in operable communication with one or more elements of the underlying device 10 including but not limited to the engine 14, and may receive various user inputs (e.g., throttle positions, control inputs, and the like) and information regarding other external operating conditions (e.g., external temperature, external barometric pressure, and the like).

The turbo speed sensor 80a includes a sensor in operable communication with the shaft 46 of the turbocharger 18. The turbo speed sensor 80a is configured to produce a signal during operation of the turbocharger 18 indicating the turbocharger's rotational speed, or the speed at which the shaft 46, the compressor wheel 66, and the turbine wheel 58 are rotating with respect to the compressor and turbine housings 62, 54. In some implementations, the turbo speed sensor 80a may include a Hall effect sensor (not shown), an optical sensor (not shown), and the like.

The compressor inlet pressure sensor 80b includes a pressure sensor in operable communication with the compressor inlet 70 of the turbocharger 18. The sensor 80b is configured to produce signals indicating the pressure at which air is entering the inlet 70 of the compressor assembly 36 of the turbocharger 18.

The compressor outlet pressure sensor 80c includes a pressure sensor in operable communication with the compressor outlet 74 of the turbocharger 18. The sensor 80c is configured to produce signals indicating the pressure at which air is exiting the outlet 74 of the compressor assembly 36 of the turbocharger 18. While the illustrated sensor 80c is shown proximate the compressor housing 62, the sensor 80c may be positioned anywhere along the fluid path between the compressor outlet 74 and the intake manifold 26. In instances where the sensor 80c is positioned a distance from the compressor outlet 74, the sensor 80c or the corresponding processor 78 may include calculations or algorithms to compensate for any pressure differences that occur over that distance.

The mass flow rate sensor 80d includes a sensor in operable communication with the compressor assembly 36 of the turbocharger 18. The sensor 80d is configured to produce signals indicating the actual mass airflow through the compressor housing 62 during operation of the turbo charger 18. In alternative implementations, the mass flow rate sensor 80d may also operate in conjunction with a temperature sensor (not shown) to output signals indicating the standard mass flow rate through the compressor assembly 36.

The intake manifold temperature sensor 80e includes a sensor in operable communication with the intake manifold 26 of the engine 14. The intake manifold temperature sensor 80e is configured to produce signals indicating the temperature of the air entering the intake manifold 26 as the engine 14 operates. In the illustrated implementation, the intake manifold temperature sensor 80e is a thermocouple; however in alternative implementations, other forms of temperature sensing devices may be utilized.

The exhaust manifold pressure sensor 80f includes a sensor in operable communication with the exhaust manifold 32 of the engine 14. The exhaust manifold pressure sensor 80f is configured to produce signals indicating the pressure of the exhaust gasses entering the exhaust manifold 32 as the engine 14 operates.

The audio sensor 80g includes a microphone or other form of listening device positioned such that it can detect the sounds and vibrations created by the turbocharger 18 during operation. More specifically, the audio sensor 80g is configured to produce a signal indicating the type or magnitude of vibrations being produced by the turbocharger 18. In some implementations, the audio sensor 80g may provide signals indicating the vibrations being produced in a particular location or by a particular portion of the turbocharger 18. In alternative implementations the audio sensor 80g may provide signals indicating the overall vibrations being produced by the entire turbocharger 18.

The oil pressure sensor 80h includes a sensor in operable communication with either the bearing assembly 50 of the turbocharger 18 or the oil feed line 86 providing oil to the bearing assembly 50. The oil pressure sensor 80h is configured to produce signals indicating the pressure at which oil is being provided to the bearing assembly 50 during operation of the turbocharger 18.

The above described sensors 80 may be present individually, in plurality, or in combination. In alternative implementations, the controller 22 may utilize additional sensors to supplement or replace the sensors listed above.

Illustrated in FIG. 2, during operation of the device 10 the processor 78 identifies and calculates the amount of wear inflicted onto the turbocharger 18 for each individual "surge event." A surge event includes any instance in which the processor 78 has calculated that the turbocharger 18 has experienced a continuous and unbroken duration of compressor surge. Compressor surge, as is well known in the art, is generally defined as an instance in which the air momentum leaving the compressor wheel 66 is insufficient to overcome the adverse pressure gradient in the diffuser in the compressor housing 62. Such conditions typically cause the flow of air through the compressor to stall and even possibly reverse toward the compressor inlet causing popping noises, stresses, and vibrations throughout the turbocharger 18. Each individual surge event may differ in duration from fractions of a second to a few seconds in duration depending on the particular operating conditions at the time the surge occurs.

In the present implementation, the processor 78 continuously receives data from each of the sensors 80 during the operation of the engine 14 and turbocharger 18. The processor 78 then compiles the information received from the sensors 80 and applies the data to a plurality of different detection methods 90a-90g.

Illustrated in FIG. 2, the different detection methods 90a-90g relied upon by the processor 78 represent an array of measurements and operating conditions considered germane in determining whether the turbocharger 18 is experiencing a surge event and to what extent or magnitude that particular surge event was. In the illustrated implementation, the processor 78 utilizes seven unique detection methods 90a-90g including: a steady-state operation score 90a, a turbo acceleration score 90b, an integral turbo speed score 90c, a pressure detection score 90d, a turbo speed score 90e, an integral intake temperature score 90f, and an acoustic measurement score 90g.

Figure 3:
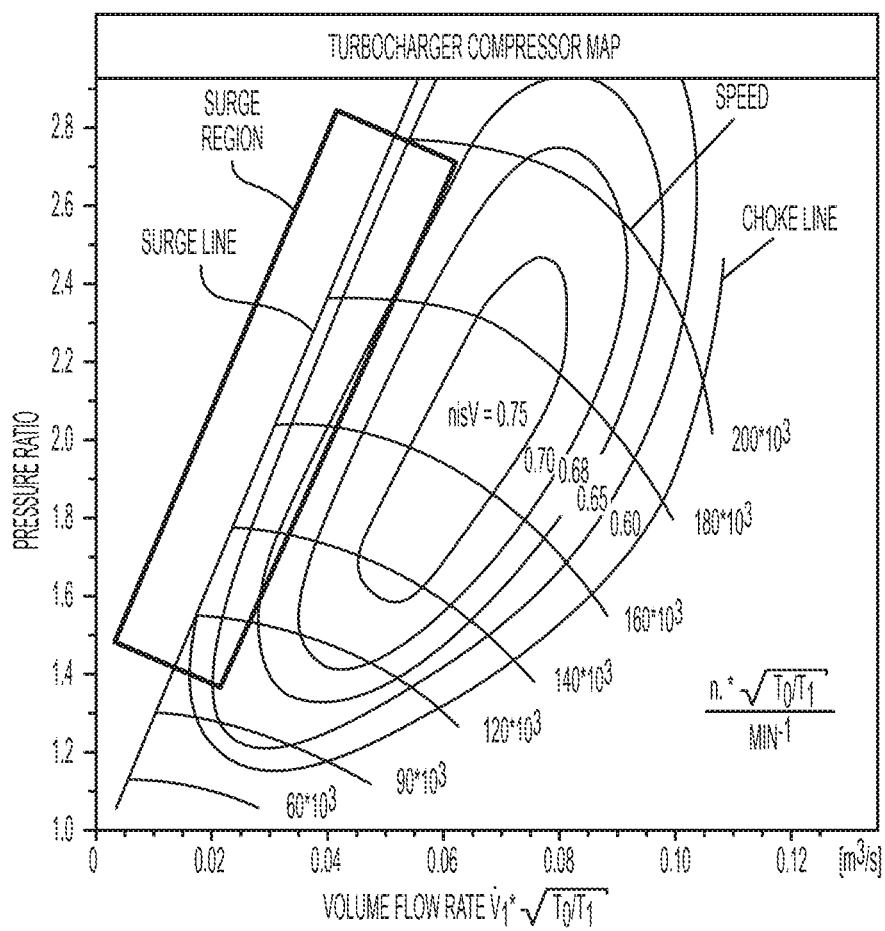
FIG. 3 is an example of a compressor map.

The steady-state operation method 90a is configured to represent the magnitude of the surge event contributed by the steady-state operating conditions of the turbocharger 18 during the surge event. More specifically, the steady-state operation method 90a outputs the numeric representation of the turbocharger's position on a compressor map, an example of which is shown in FIG. 3. The steady-state operation method 90a takes into consideration the ratio of the compressor inlet pressure (as measured by the compressor inlet pressure sensor 80b) to the compressor outlet pressure (as measured by the compressor outlet pressure sensor 80c) in addition to considering the air mass flow rate through the compressor 36 (as measured by the mass flow rate sensor 80d).

The turbo acceleration method 90b is configured to represent the magnitude of the surge event contributed by acceleration of the rotating elements of the turbocharger 18 during the surge event (i.e., the rate of change in speed of rotation of the shaft 46, compressor wheel 66, and turbine wheel 58; as measured by the turbo speed sensor 80a). In some implementations, the turbo acceleration method 90b may include comparing the measured acceleration rate to a predetermined maximum acceleration value. In other implementations, the turbo acceleration method 90b may include utilizing an algorithm to assign a unique score dependent upon the measured acceleration rate itself.

The integral turbo speed method 90c is configured to represent the magnitude of the surge event contributed by the detection of an inflection point on the integral of the turbocharger rotational speed (i.e., the rotational speed of the shaft 46, the compressor wheel 66, and the turbine wheel 58; as measured by the turbo speed sensor 80a). In some implementations, the detection of an inflection point dictates the use of a first predetermined score while lack of an inflection point during the surge event dictates the use of a second predetermined score.

The pressure detection method 90d is configured to represent the magnitude of the surge event contributed by the relative pressure values measured at the compressor outlet 74 of the compressor assembly 36 and the exhaust manifold 32. In some implementations, the pressure detection method 90d is the numeric result of placing the measured outlet 74 pressure (as measured by the compressor outlet pressure sensor 80c) and the measured exhaust manifold 32 pressure (as measured by the exhaust manifold pressure sensor 80f) into a predetermined algorithm. In alternative implementations, the pressure detection method may include comparing the outlet 74 pressure to the exhaust manifold 32 pressure.

The turbo speed method 90e is configured to represent the magnitude of the surge event contributed by the peak rotational speed of the turbocharger 18 during the surge event. In some implementations, the controller 78 may compare the peak rotational speed of the turbocharger 18 (as measured by the turbo speed sensor 80a) to a predetermined maximum rotational value. In alternative implementations, the controller 78 may assign a unique score depending upon the detected maximum rotational speed.

The integral intake temperature method 90f is configured to represent the magnitude of the surge event contributed by the detection of an inflection point on the integral of the measured temperature values in the intake manifold 26 of the engine 14. In some implementations, the detection of an inflection point triggers the method to produce a particular score while lack of an inflection point during the surge event results in a different score.

The acoustic measurement method 90g is configured to represent the magnitude of the surge event contributed by the detection of certain acoustic patterns during the operation of the turbocharger 18. In the illustrated implementation, the acoustic measurement method 90g may be representative of matching a particular type or style of sound wave to a predetermined wave type or including an algorithm based at least in part on the magnitude of the vibrations detected.

While the present implementation of the controller 78 calculates each of the previous seven detection methods 90a-90g, it is to be understood that the controller 78 may include more or fewer detection methods as necessary.

The processor 78 inputs the preliminary data collected from the sensors 80 into each of the above described detection methods 90a-90g to produce a unique "preliminary surge score 94a-94g." The preliminary surge score 94a-94g in turn represents the magnitude each detection method 90a-90g has contributed to the overall magnitude of the surge event in question.

Having calculated raw surge score 94a-94g for each of the unique detection methods 90a-90g, the processor 78 then scales each score according to a unique weighting factor 98a-98g to produce a weighted surge score 102a-102g for each detection method 90a-90g. More specifically, the processor 78 adjusts each preliminary surge score 94a-94g by a unique weighting factor 98*a*-98*g* intended to express the significance or relevance a particular detection method 90*a*-90*g* has in representing the existence or magnitude of a surge event. Furthermore, in addition to scaling the scores to represent relative importance of each detection method 90*a*-90*g*, the weighting factors 98*a*-98*g* also serve to convert each preliminary surge score 94*a*-94*g* into values that are compatible with one another and that can be later combined. For example, detection methods 90*a*-90*g* considered to be less indicative of the magnitude of the surge event may be reduced in importance by weighting them less than other detection methods 90*a*-90*g*. Meanwhile, detection methods 90*a*-90*g* considered to be more indicative of the magnitude of a particular surge event may be increased in importance by weighting them greater than other detection methods 90*a*-90*g*.

In some implementations, each weighting factor 98*a*-98*g* may include a static multiple applied to each preliminary surge score 94*a*-94*g*. For example, preliminary surge score A is multiplied by 0.5 and preliminary score B is multiplied by 2.5, indicating that preliminary score B is generally more indicative of the magnitude of the surge event than preliminary score A. In alternative implementations, each unique weighting factor 98*a*-98*g* may be determined by an algorithm that varies the weighting factor for a particular detection method 90*a*-90*g* based on the resulting preliminary surge score. For example, a small change in turbo acceleration 90*b* may be weighted relatively low (i.e., by a factor of 0.5) as it provides little insight as to the magnitude of a surge event while a large change in turbo acceleration may be weighted relatively high (i.e., by a factor of 2) because it is much more indicative of a high-magnitude surge event. In still other implementations, a combination of static and variable weighting factors may be used.

With the weighted surge scores 102*a*-102*g* for each detection method 90*a*-90*g* calculated, the processor 78 then combines the weighted surge scores 102*a*-102*g* to produce a final "combined surge score" 106. Unlike the above scores, which are limited to a particular detection method 90*a*-90*g*, the combined surge score 106 is representative of the overall magnitude of the surge event, the overall magnitude of the surge event being representative of how intense a particular surge event is in total. In the illustrated implementation, the combined surge score 106 is represented on a scale from 1 to 100, with higher scores representing more intense surge events. In alternative implementations, the combined surge score 106 may be represented in units of magnitude or separated into different levels (e.g., the surge event was a level 5 surge, which qualifies as "most damaging"). In the illustrated implementation, the combined surge score 106 is calculated by adding each of the weighted surge scores 102*a*-102*g* together. In alternative implementations, the weighted surge scores 102*a*-102*g* may be multiplied together or may be entered into an algorithm or equation to produce a final score.

With the combined surge score 106 calculated, the processor 78 may then determine whether or not an actual surge event has occurred. In some implementations, such a determination may be made by comparing the combined surge score 106 with a predetermined cut-off value. If the combined surge score 106 is larger than a predetermined cut-off value, the surge event counter 108 is indexed and the processor 78 records the combined surge score 106 and other relevant data in the memory unit 82. If the combined surge score 106 rises back above the predetermined cut-off point, the surge event counter will be indexed a second time indicating a second surge event has occurred. In other implementations, the processor 78 may continuously calculate the combined surge score 106 over a predetermined time interval then combine, average, or otherwise take into account the various readings accumulated during the single surge event.

In instances where a surge event has been calculated to have occurred, the processor 78 applies the surge data to the corresponding operating conditions of the turbocharger 18 to calculate the actual wear the surge event has imparted onto the components of the turbocharger itself. More specifically, the processor 78 applies the combined surge score 106 to a "wear factor 110" to calculate how much wear the turbocharger 18 received during the particular surge event, also known as the "total wear score 114." In the illustrated implementation, the level of wear inflicted by a particular surge event is measured in "units of wear."

In the illustrated implementation, the wear factor 110 is at least partially dependent upon the oil pressure supplied to the bearing assembly 50 during the event. Specifically, the higher the oil pressure at the bearing assembly 50, the less damaging a particular surge event is on the turbocharger 18 (i.e., the lower the wear factor 110). Meanwhile, the lower the oil pressure at the bearing assembly 50, the more damaging a particular surge event is on the turbocharger 18 (i.e., the higher the wear factor 110). For example, a single surge event with a combined surge score of 60 may convey 10 units of wear with 500 Kpa of oil pressure present at the bearing assembly 50, meanwhile the same surge event with a combined surge score of 60 may convey 20 units of wear if only 350 Kpa of oil pressure is present at the bearing assembly 50. While the wear factor 110 of the present implementation is at least partially dependent upon the oil pressure present at the bearing assembly 50, in alternative implementations different factors may also be considered such as, but not limited to, the age of the turbocharger 18, the number of operating hours on the turbocharger 18, the outside temperature, the specific turbocharger model installed on the engine 14, the wear already applied to the turbocharger 18, and the like.

Having determined how many units of wear a particular surge event has inflicted upon the elements of the turbocharger 18, the processor 78 may then store the event in the memory unit 82 of the controller 22. Once stored, the processor 78 may display the information to the user in real time via the user interface 84. In particular, the processor 78 may indicate that a surge event has occurred, provide the magnitude of the event (i.e., combined surge score 106) and indicate how much wear the turbocharger 18 sustained (i.e., the total wear score 114).

In addition to calculating the magnitude and wear created by a single surge event, the controller 22 may also utilized stored data representing past surge events to calculate and predict the wear applied to the turbocharger 18 over its entire lifespan. More specifically, the processor 78 may apply the individual event data to a "service life wear score" 118, which is representative of the total amount of wear that a particular turbocharger 18 can receive before needing to be serviced or replaced. Similar to the total wear score 114, the service life wear score 118 is also measured in "units of wear." As such, the processor 78 is able to subtract a given number of units from the service life wear score 118 after each surge event to calculate, among other things, how long before the turbocharger 18 will need to be replaced, how many surge events the turbocharger 18 has experienced, how many surge events the turbocharger can withstand before needing replacement, how much wear is inflicted by an average surge event, the magnitude of an average surge event, and the like. This information, in turn, can be presented to the user via the user display 84 such that the user can take the necessary precautions to limit the severity of each individual surge event, or conduct preventative maintenance to rebuild or replace the turbocharger 18 before it fails. Still further, the user can monitor which actions cause the events to occur and modify the operation of the device 10 to minimize surge events.

As one example, if a given turbocharger 18 is deemed to be able to withstand 500 units of wear before needing to be replaced, and after 3 years of use the turbocharger has experienced 250 units of wear over 10 surge events, the processor 78 is able to predict, given the average usage of the device, that the turbocharger will likely need to be replaced in 3 years. Furthermore, the processor 78 may also calculate that the average surge event over the service life of the turbocharger results in 25 units of wear (i.e., 5% of the turbochargers wear allocation) and that the turbocharger can likely withstand 10 more "average" surge events before needing replacement.

The invention claimed is:

1. A turbocharged device comprising:
   a turbocharger;
   a first sensor in operable communication with the turbocharger and configured to output a first signal representative of a first attribute of the turbocharger;
   a second sensor in operable communication with the turbocharger and configured to output a second signal representative of a second attribute of the turbocharger; and
   a controller in operable communication with the first sensor and the second sensor, the controller configured to:
      calculate a first preliminary surge score based at least in part on the first signal,
      calculate a first weighted surge score based at least in part on the first preliminary surge score and a first weighting factor,
      calculate a second preliminary surge score based at least in part on the second signal, and
      calculate a second weighted surge score based at least in part on the second preliminary surge score and a second weighting factor, wherein the value of the first weighting factor relative to the value of the second weighting factor is configured to express the surge significance of the first preliminary surge score relative to the second preliminary surge score.

2. The turbocharged device of claim 1, wherein the controller is configured to combine the first weighted surge score and the second weighted surge score to produce a combined surge score.

3. The turbocharged device of claim 2, wherein the controller is configured to compare the combined surge score to a predetermined cut-off value.

4. The turbocharged device of claim 2, wherein the controller is configured to calculate a wear score based at least in part on the combined surge score and an oil pressure present in the turbocharger, and wherein the controller is configured to compare the wear score to a service life wear score.

5. The turbocharged device of claim 1, wherein the first weighting factor is different than the second weighting factor.

6. The turbocharged device of claim 1, wherein the first weighting factor is constant.

7. The turbocharged device of claim 1, wherein the first weighting factor is variable.

8. The turbocharged device of claim 1, wherein the first sensor is selected from the group consisting of a turbo speed sensor, a compressor inlet pressure sensor, a compressor outlet pressure sensor, a mass flow-rate sensor, an intake manifold temperature sensor, and an exhaust manifold pressure sensor.

9. A turbocharged device comprising:
   a turbocharger;
   a plurality of sensors in operable communication with the turbocharger and each configured to output a signal representative of an attribute thereof; and
   a controller configured to detect when a surge event occurs and calculate a unique combined wear score based at least in part on the output signals of the plurality of sensors, and
   wherein the controller is also configured to compare the combined wear score to a service life wear score of the turbocharger.

10. The turbocharged device of claim 9, wherein the controller is configured to alert a user when the combined wear score is greater than or equal to the service life wear score.

11. The turbocharged device of claim 9, wherein the combined wear score is based at least in part on an oil pressure within the turbocharger.

12. A method of determining the magnitude of a potential surge event in a turbocharger having a first sensor and a second sensor in operable communication therewith, the method comprising:
   calculating a first preliminary surge score based at least in part on a first signal output by the first sensor;
   calculating a first weighted surge score based at least in part on the first preliminary surge score and a first weighting factor;
   calculating a second preliminary surge score based at least in part on a second signal output by the second sensor;
   calculating a second weighted surge score based at least in part on the second preliminary surge score and a second weighting factor, wherein the value of the first weighting factor relative to the value of the second weighting factor is configured to express the surge significance of the first preliminary surge score relative to the second preliminary surge score;
   combining the first weighted surge score and the second weighted surge score to produce a combined surge score; and
   comparing the combined surge score to a predetermined cut-off value.

13. The method of claim 12, further comprising indexing a surge counter if the combined surge score exceeds the predetermined cut-off value.

14. The method of claim 12, further comprising detecting an oil pressure within the turbocharger; and
   calculating a wear score based at least in part on the detected oil pressure and the combined surge score.

15. The method of claim 14, further comprising comparing the wear score to a service life wear score.

16. The method of claim 15, further comprising alerting a user when the wear score is greater than or equal to the service life wear score.

17. The method of claim 12, wherein at least one of the first sensor and the second sensor is selected from the group consisting of a turbo speed sensor, a compressor inlet pressure sensor, a compressor outlet pressure sensor, a mass flow-rate sensor, an intake manifold temperature sensor, and an exhaust manifold pressure sensor.

18. The method of claim 12, further comprising:
calculating a wear score based at least in part on the combined surge score; and
comparing the wear score to a service life wear score.

* * * * *